Figure 1:
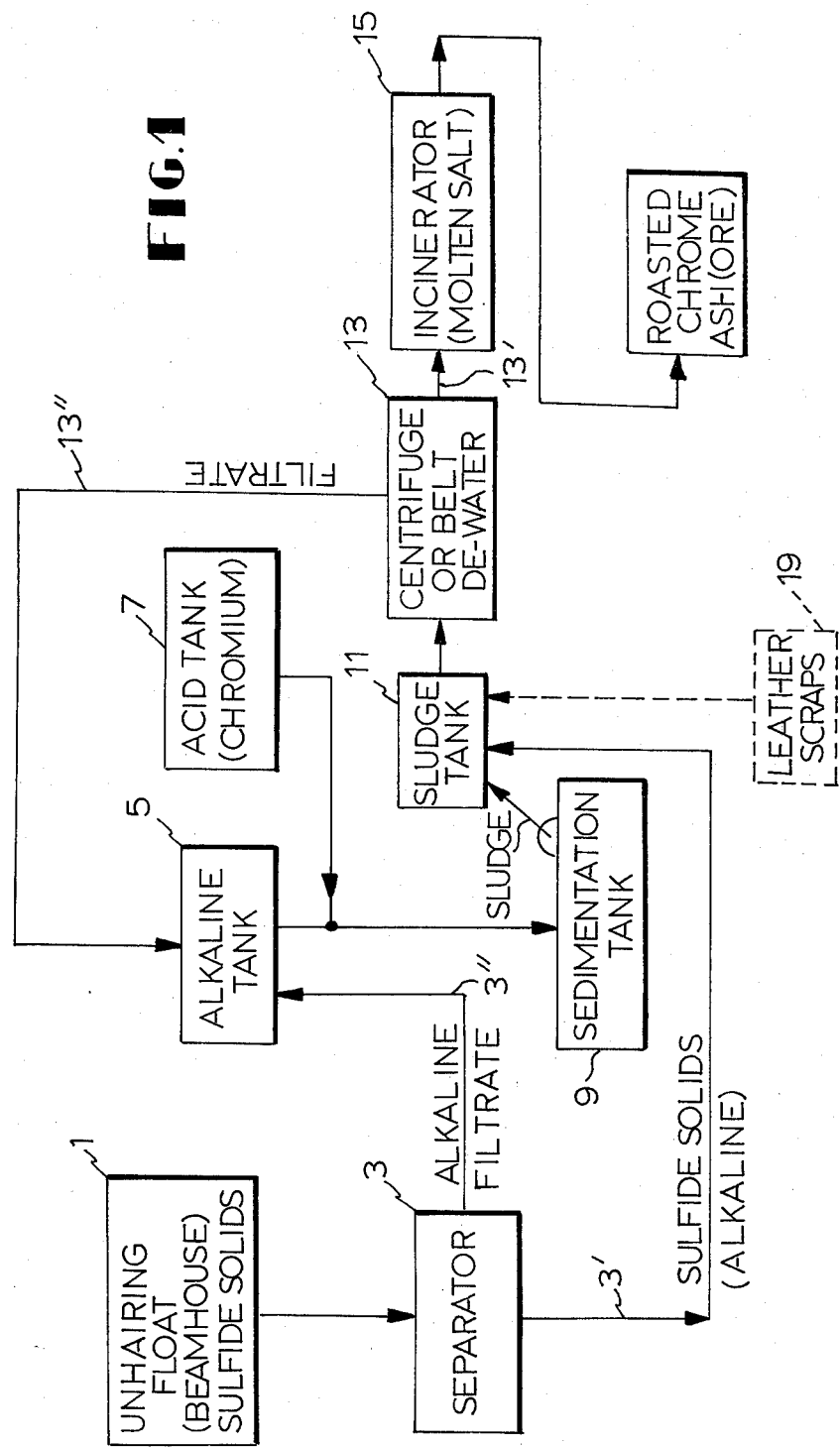

United States Patent [19]

Cartier

[11] 4,215,989
[45] Aug. 5, 1980

[54] PROCESS FOR CHROME RECOVERY FROM INDUSTRIAL WASTE AND THE LIKE, AS FROM CHROME-LADENED TANNERY WASTE, INCLUDING POLLUTION CONTROL OF THE SAME

[75] Inventor: James E. Cartier, Saco, Me.

[73] Assignee: Saco Tanning Division of Kirstein Leather Co., Saco, Me.

[21] Appl. No.: 916,464

[22] Filed: Jun. 19, 1978

[51] Int. Cl.² .............................................. C14C 3/06
[52] U.S. Cl. ........................................ 8/94.27; 423/53
[58] Field of Search .......................... 8/94.27; 423/53

[56] References Cited

U.S. PATENT DOCUMENTS

| | | | |
|---|---|---|---|
| 2,766,098 | 10/1956 | Perrin | 8/94.27 |
| 3,816,095 | 6/1974 | Bruen et al. | 423/53 |
| 3,819,799 | 6/1974 | Matschke et al. | 423/53 |
| 3,822,993 | 7/1974 | Robinson et al. | 8/94.27 |
| 3,852,059 | 12/1974 | Bruen et al. | 423/53 |
| 3,937,785 | 2/1976 | Gancy et al. | 423/53 |
| 3,950,131 | 4/1976 | Young | 423/607 |
| 4,086,319 | 4/1978 | Jones | 423/607 |

FOREIGN PATENT DOCUMENTS 489123 12/1952 Canada ...................................... 8/94.27

*Primary Examiner*—Ronald W. Griffin
*Attorney, Agent, or Firm*—Rines and Rines, Shapiro and Shapiro

[57] ABSTRACT

This disclosure is concerned with a tannery primary treatment process that, in total combination, or as separate sub-process features, enables the reducing of BOD loading in such treatment, while increasing the efficiency of hexavalent chrome recovery therefrom by separating out alkaline sulfide solids from the normal unhairing beamhouse stage and utilizing the same to attain appropriate sedimentation tank sludge pH for oxidation of the chrome to the hexavalent state during incineration; and/or increasing the hexavalent chrome recovery by backwetting and roasting the ash again; and/or enabling use of such ash for recycling as a chrome tanning liquor with the side-production of an improved flocculating chrome water wash for waste treatment use.

13 Claims, 3 Drawing Figures

PROCESS FOR CHROME RECOVERY FROM INDUSTRIAL WASTE AND THE LIKE, AS FROM CHROME-LADENED TANNERY WASTE, INCLUDING POLLUTION CONTROL OF THE SAME

The present invention relates to processes for chrome recovery from industrial waste and the like, as from chrome-ladened tannery waste, including control of polluting aspects of the same and improvements in overall tannery process operation and efficiency.

The prior art is replete with techniques for incinerating industrial waste solids, as in tannery operations and the like, and also for recovering useful products therein; including in the case of chrome-ladened tannery waste, the recovery of chromium therefrom. A summary of prior proposals is contained in a master's thesis of Richard E. Petruschka, published in 1959 at the University of Cincinnati and entitled "A Study of Chrome Recovery From Spent Tanning Liquors". As an example, in "The Chemistry and Technology of Leather", Chapter 48, page 471, Reinhold Publishing Corp., 1962, reference is made to a chromium recovery process in which the chrome bearing wastes were carbonized and treated with dry chlorine gas and the chromium reclaimed (Italian Pat. No. 424,671), Aug. 28, 1947, Airoldi, R. and Stratta, R.). U.S. Pat. No. 3,950,131 discloses chrome recovery by a continuous filtration procedure. In an article entitled: "Report on Methods of Chromium Recovery and Reuse From Spent Chrome Tan Liquor", by Raymond Hauck, pages 422–430 of the Journal of the American Leather Chemists Association, Volume LXVII, No. 10, Oct. 1972, furthermore, a number of prior proposals for recovering chromium are summarized, including precipitation with alkali. More recently, U.S. Pat. No. 4,086,319 to B. H. Jones describes a method for incinerating tannery waste solids and for recovering chromium through the use of a molten salt incineration technique successfully tested in a pilot trial in the summer of 1976 at the Saco, Maine plant of the Saco Tanning Company, the assignee of the present application. As an additional illustration of related prior art, U.S. Pat. No. 3,950,131 discloses a continuous method for reclaiming chromium compounds, such as chromium hydroxide, which heretofore were discharged as industrial waste from chrome liquor tanneries, which method involves agitated filtration of chrome sludge through successive filtering zones. In U.S. Pat. Nos. 2,766,098 and 3,822,993, on the other hand, processes are disclosed for producing appropriate chrome tanning compositions respectively from waste by-products of the manufacture of chromic acid, and from the waste liquor resulting from the pickling of cuprous material with an aqueous sulfuric acid-sodium dichromate solution which reduces some of the hexavalent chromium content to the trivalent state and is then subsequently neutralized. U.S. Pat. No. 3,819,799, moreover, proposes to recover trivalent chromium from an appropriate waste stream with the aid of an organic soil.

Despite these varied proposals, the problems of pollution control of the industrial waste water resulting from tannery operations and the like, and reclamation of chrome substantially exclusively in appropriate form from such waste and from leather shavings, as well, have not heretofore been adequately solved. In accordance with the present invention, it is an objective to provide novel processes that enable all of these ends to be attained in a highly commercial manner; and a particularly important object of the invention further resides in providing an extremely efficient technique for reclaiming the chrome in the form of a chrome tanning agent from the residual ash that results from incinerations of the chrome-bearing sludge.

In summary, such reclamation is effected by a chemical reduction performed on the entire amount of ash residue, extracting chrome from the residue and at the same time forming the chrome tanning liquor which allows for the recycling of the chrome within the tanning operation. This procedure not only produces an appropriate chrome tanning liquor with specific tanning properties, but also results in an inert residue which is safely disposable, non-polluting, and even useful as a filler material in the leather manufacturing process or as a form of clay. Other features and details of the invention are hereinafter delineated and are pointed out in the appended claims.

As additional object of the invention is to provide such a novel process that enables improved reclamation of chrome from leather shavings.

Other and further objects are explained hereinafter and are more particularly set forth in the claims.

Figure 2:
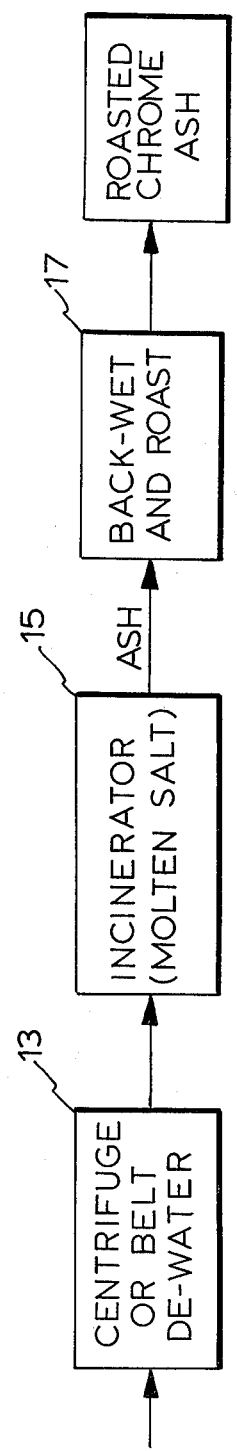
Figure 3:
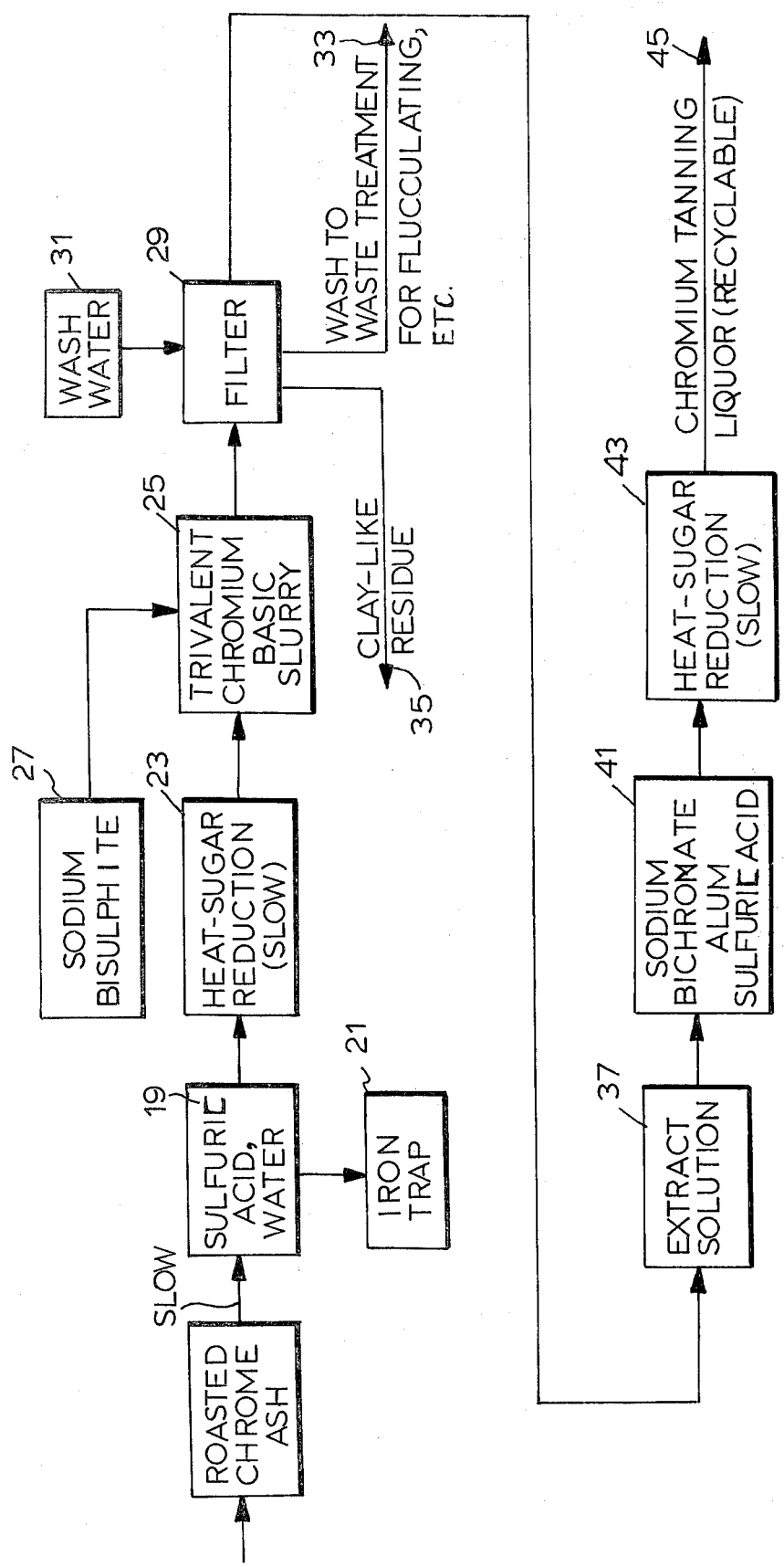

The invention will now be described with reference to the accompanying drawings, FIG. 1 of which is a flow or block diagram illustrating a preferred tannery process for eliminating high BOD levels and improving efficiency;

FIG. 2 is a similar view of a feature of the invention enabling substantially complete conversion of the chromium in the ash from the trivalent to the hexavalent state; and FIG. 3 is a flow chart of the preferred extraction-reduction process feature of the invention for recovering a trivalent chromium tanning liquor for recycling, and a useful flocculating waste treatment by-product improvement.

In normal chromium tanning operations, the float output of the unhairing beamhouse, with its substantial sulfide solids, is passed to an alkaline tank, the output of which is mixed with chromium acid and fed to a sedimentation tank. The resulting sludge is pumped to a sludge holding tank. It is then centrifuged or belt or similarly de-watered, and the resulting solids are disposed of.

A significant improvement in such primary tanning processes is illustrated in FIG. 1 for reducing the inherent biological oxygen demand (BOD) loading, while also markedly increasing the efficiency of hexavalent chrome recovery therefrom. In accordance with a feature of this invention, the sedimentation tank is not loaded with the sulphide solids from the beamhouse, and there is no requirement for the addition of lime and soda ash chemical treatment of the sludge output of the sedimentation tank. Specifically, the output of the beamhouse 1 is applied to a separator 3 which separates out a substantial portion of the sulphide solids at 3' and passes the alkaline filtrate at 3" to the alkaline equalization tank 5. The separator 3 can remove all of the suspended substrate solids in the beamhouse 1, which represents from 25–40% of the total solids from the beamhouse. The output of the alkaline tank 5 is mixed with trivalent chromimum acid from the acid tank 7 and is then applied to the sedimentation tank 9. The sludge pumped from the sedimentation tank 9 is rendered alkaline to the required degree by feeding the separated alkaline sulphide solids to the sludge along path 3' to the sludge tank 11. The centrifuging or other de-watering at 13, filtrate feed-back 13" to the alkaline tank 5, and incineration at 15 of the resulting solids at 13' may proceed as taught, for example, in the said Jones patent, effecting incineration at relatively low temperatures (say, 850°–1000° F.) and with the use of molten salt beds that enable the oxidation of chromium at least partially to the hexavalent state and the scrubbing of the air stream to remove particulates and odor. Other incineration treatments may, of course, also be employed.

In addition to the virtue of using waste materials at 3' to provide the alkalinity in the sludge tank 11, the system of FIG. 1 has eliminated (or greatly minimized) the necessity for the additional lime and sodium ash chemical additives that might be needed, as before described. Instead of adding new chemicals, thus, the alkaline waste load is used effectively to pre-treat the sludge for incineration. Since the sulphide solids 3' are separated out at 3 and not added to the sedimentation tank 9, moreover, the load of solids in that tank is greatly reduced. The resulting smaller volume and loads provide more efficient primary settling in the tank; and, in addition, at least 50% of the BOD loading in the unhairing float is removed in the separator 3. The overall BOD in the alkaline tank 5 is considerably less in accordance with this process.

The incineration process at 15, in the presence of carbonate, is effected with hot air, and requires sufficient alkalinity to raise the pH to at least about 11.5, or preferably 12, for essential conversion of the trivalent state of the chromium to the desired hexavalent state. The roasted chrome ash will resemble a roasted chrome ore.

An additional feature may reside in applying prepared leather shavings and/or leather scrap pieces, shown dotted at 19 in FIG. 1, along with the alkaline solids 3", and, if necessary pH-adjusting lime and soda ash, to the sludge slurry at 11 as a solids-fortifying treatment before de-watering.

As another example, where there is no chrome sludge slurry, but there is leather scrap or chrome-leather shavings, the same may be used with appropriate lime and soda ash, de-watered and then incinerated for chrome recovery as hereinafter described. In the event, furthermore, that a beamhouse float is available but no chrome sludge slurry, such leather scrap and/or shavings may be pre-treated with the beamhouse float, with or without lime and soda ash, depending upon pH requirements, prior to dewatering. In the event that a spent unhairing liquor is not available, moreover, such leather shavings and/or scrap pieces may be added to the sludge slurry along with lime and soda ash, as necessary, as a pre-treatment before such dewatering.

A further feature of the invention resides in the discovery that the desired hexavalent conversion of the chromium in the ash can be assured, to substantial completion, by taking the total ash resulting from the present high-temperature incineration (say, 1500°), the lower-temperature incineration before discussed (say 850°–1000°), or a chrome ash resulting from some other process, and backwetting and roasting it again, with alkali, if necessary, one or more times, as shown at 17 in FIG. 2. This feature is useful with other ash or roasted ore sources as well. In present systems, the ash coming from sludge high-temperature incineration has approximately 50% of the chrome still in the insoluble trivalent state, which presents extraction difficulties in handling.

It has been found, however, that by mixing this ash with water and roasting it at 17, at relatively low temperatures, say at 950° F. (850°–1000° F.), substantially complete oxidation is remarkably achieved.

As a consequence of this unusual result, chrome extraction can be efficiently effected from the resulting ash, preferably by suitable continuous pressure or vacuum filtration, as later explained in detail, with the separated chrome extraction solution being re-cycled to the tanning process as by incorporating the same as part of the chrome tanning liquor. The state of the chromium present in the waste stream of the recovery procedure permits ready discharge for use as an improved chemical flocculating agent in waste treatment systems or the like; or may be returned to the tannery process as a pickle float, or a pre-tan float, alone or together with the extract solution. The spent exhaust chrome float from the tanning process and/or the wash water from the extraction process may be recovered and re-cycled to the tanning process by adjustment of pH, causing a chromium hydroxide sludge separation with subsequent addition to the next shavings as a pretreatment assist for incineration, or addition to the second reduction for the new one-bath chrome tan liquor production.

The invention thus achieves the novel result of enabling re-cycling of nearly all of the chromium present in both the liquid and solid tannery waste. The only chemical raw material used (bichromate), moreover, is used in proportion only to the amount of chromium present in the leather product being made by the tannery; and the use of leather solid waste to fortify the chrome sludge results in cost-effective incineration and a substantially complete chrome re-cycling effort. If, furthermore, a portion of the recovered chromium is employed as a chemical flocculating agent for the waste treatment plant, as above suggested, such is also re-cyclable. The re-cycling of the flocculating agent adds a new dimension, also, to the art of suspended solids removal in this application.

Turning, now, to the portion of the invention concerned with this chromium extraction from the completely hexavalent chromium ash developed by the invention, the ash to be used is now the roasted product of FIG. 2 wherein the trivalent chromium present in the chrome sludge and/or chrome leather shavings and scrap pieces 19 (FIG. 1) is fully converted to the soluble hexavalent chromium state. A successful procedure for effecting this extraction will now be described with laboratory-testing proportions that are substantially scaleable for full-scale production.

A prescribed amount of ground roasted chrome ash from FIG. 2 (say, 150 grams for a laboratory sample) is added slowly, while mixing, in FIG. 3, to an acid-water solution 19 consisting of sulfuric acid (67.5 ml) added to cold water (300 ml). The resulting brown-orange slurry may be recirculated through a breaking-up mixer (not shown) for the decapsulation of available soluble chromium, being passed through a magnetic trap 21 to remove iron. The acid ash slurry (pH below 1) is heated to about 185° F., while mixing, as a starting temperature for the reduction step. A reducing agent, such as $SO_2$, or preferably a sugar or sugar-like reducing agent such as 1—1 corn syrup-water solution (30 ml), is slowly added at 23, resulting in an increased temperature of about 218° F. at which a complete reduction is achieved, converting the available hexavalent chromium present in the ash to the trivalent state as a dark green trivalent basic chromium sulfate extract solution.

Following mixing of the reduced slurry and a period of standing (say, two hours or so) at 25, sodium bisulphite at 27 is added (1 gram) and the slurry is diluted (450 ml) and mixed to assure complete reduction of available hexavalent chromium. After standing, the extract solution is separated from the residue using a pressure filter or a flat bed vacuum filter 29, while keeping separate the entire filtrate from the mix. The bed is flushed and washed at 31 in the filter 29 to remove all soluble extract solution, with the wash water 33 sent to the primary waste treatment plant to act as a flocculating chemical agent as before described. It has been found that about one-quarter the amount of this type of waste water, as compared with conventional chrome waste, is required to do the same flocculating work, apparently because the waste water of the invention has less heavily masked trivalent chromium. This represents a marked economy for polymer treatment plant operation.

The washed residue 35 from the filter is useable as either sanitary land fill, or can be formed into bricks or other suitable application for an inert clay.

Tests run both by the polarographic method and by the colormetric method using diphenylcarbazide, indeed, have indicated no detectable hexavalent chromium present in the residue.

The reduced extract solution 37 is useful for preparation into the desired tanning chrome liquor formulation for recycling into the tannery or related operation. After its analysis for acidity and bichromate concentrations, and based upon the levels and desired proportions of recovered chrome desired to be present in the one-bath chrome liquor, a specified amount of fresh 69% sodium bichromate solution 41 is employed with which a prescribed amount of liquid alum and concentrated sulfuric acid is mixed. To this is slowly added a prescribed volume of the reduced extract solution 39 above-described, effectively oxidizing the chromium in the extract solution. The entire mix is heated to a starting temperature of 185° F., and a suitable amount of corn syrup sugar solution is added at 43 to secure the reduction to an alum chrome tanning liquor for recycling at 45.

Thus has the invention in its totality enabled substantially complete chromium recovery and re-use; it being understood that where portions only of the total process are desired, such sub-process portions may only be employed. Further modifications will also occur to those skilled in this art, and such are considered to fall within the spirit and scope of the invention as defined in the appended claims.

What is claimed is:

1. A process for reducing BOD loading in tannery primary treatment, while increasing the efficiency of chrome recovery therefrom and enabling substantial chrome reclamation and re-use, said process comprising, alkaline-treating skins and the like to unhair the same; separating out a filtrate and a substantial portion of the resulting alkaline solids; applying the filtrate to an alkaline equalization tank, mixing the same with trivalent chrome acid and feeding the mix to a sedimentation tank with substantially reduced alkaline solids and associated BOD loading; removing the resulting sludge from the sedimentation tank and applying thereto the said alkaline solids sufficiently to raise the pH to at least 11.5 to 12 so as to provide conditions required, upon incineration, efficiently to oxidize the trivalent chrome to the hexavalent state; dewatering the sludge; incinerating the resulting solids in the presence of hot air and carbonate to recover chrome ash in the hexavalent state; increasing the efficiency of such hexavalent chrome recovery by backwetting the ash and roasting the same to improve the hexavalent conversion; and utilizing such of the ash as it is desired to reclaim for the tannery treatment operation by adding the same to a sulfuric acid-water solution to form an acid ash slurry; adding a reducing agent to the slurry to convert the hexavalent chromium to the trivalent state; filtering out an extract solution, water-washing the filtering, and recovering the residue; applying the waterwash to use as one of waste treatment processing as a flocculating agent, a component of a pickling agent, and a re-cycled solution; and utilizing the extract solution for one of pre-tanning and production of a chrome tanning liquor.

2. A process as claimed in claim 1 and in which the production of the chrome tanning liquor is effected by adding the extract solution to a solution of sodium bichromate, alum and sulfuric acid and then reducing the same to produce a chrome tanning liquor for recycling in said primary treatment.

3. A process for reducing BOD loading in tannery primary treatment while increasing the efficiency of hexavalent chrome recovery therefrom, that comprises, alkaline-treating skins and the like to unhair the same; separating out a filtrate and a substantial portion of the resulting alkaline solids; applying the filtrate to an alkaline equalization tank, mixing the same with trivalent chrome acid and feeding the mix to a sedimentation tank with substantially reduced alkaline solids and associated BOD loading; removing the resulting sludge from the sedimentation tank and applying thereto the said alkaline solids sufficiently to raise the pH to at least 11.5 to 12 so as to provide conditions required, upon incineration, efficiently to oxidize the trivalent chrome to the hexavalent state; dewatering the sludge; and incinerating the resulting solids in the presence of hot air and carbonate to recover chrome ash in the hexavalent state.

4. A process as claimed in claim 3 and in which said substantial portion of separated alkaline solids is adjusted to from about twenty five to about forty percent of the total solids in said alkaline treating.

5. A process as claimed in claim 3 and in which at least one of leather shavings and leather scraps are added prior to said dewatering to fortify the solids.

6. A process in tannery primary treatment for increasing the efficiency of hexavalent chrome recovery therefrom, that comprises, alkaline-treating skins and the like to unhair the same, applying such to an alkaline equalization tank, mixing the same with trivalent chrome acid and feeding the mix to a sedimentation tank; removing the resulting sludge from the sedimentation tank; dewatering the sludge; incinerating the resulting solids in the presence of hot air and carbonate to recover chrome ash in the hexavalent state; and backwetting the ash and roasting the same to improve the hexavalent conversion.

7. A process as claimed in claim 6 and in which the roasting is performed in the range of substantially 850°–1000° F.

8. A process for treating trivalent-chrome-treated leathers and the like for hexavalent chrome recovery therefrom, that comprises, rendering said trivalent chrome-treated leathers alkaline; incinerating the same in the presence of air and carbonate to recover chrome ash; and backwetting the ash and roasting the same to induce conversion of the chrome to the hexavalent state.

9. A process for improving the conversion of trivalent chrome in tannery and similar ash containing oxidizing chemicals and the like, that comprises, backwetting the ash and roasting the same.

10. A process for reclaiming chromium from roasted chromium ash containing chromium in substantially completely the hexavalent state, that comprises, adding the ash to a sulfuric acid-water solution to form an acid ash slurry; adding a reducing agent to the slurry to convert the hexavalent chromium to the trivalent state; filtering out an extract solution, water-washing the filtering, and recovering the residue; applying the water-wash to use as one of waste treatment processing as a flocculating agent, a component of a pickling agent, and a re-cycled solution; and utilizing the extract solution for one of pretanning and production of a chrome tanning liquor.

11. A process as claimed in claim 10 and in which the production of the chrome tanning liquor is effected by adding the extract solution to a solution of sodium bichromate, alum and sulfuric acid and then reducing the same to produce a chrome tanning liquor.

12. A process as claimed in claim 10 and in which said reducing agent and said reducing step comprise utilization of a sugar-like solution.

13. A process as claimed in claim 10 and in which, prior to said filtering, sodium bisulphite is added to insure full conversion of the hexavalent chromium to the trivalent state.

* * * * *